United States Patent [19]

Kanao

[11] Patent Number: 5,601,119
[45] Date of Patent: Feb. 11, 1997

[54] HOSE INCLUDING REINFORCING THREADS AND METHOD OF PRODUCING THE SAME

[76] Inventor: Shiro Kanao, 9-18, Nanpeidai 4-chome, Takatsuki-shi, Osaka, Japan

[21] Appl. No.: 163,719

[22] Filed: Dec. 9, 1993

[30] Foreign Application Priority Data

Dec. 9, 1992 [JP] Japan .................................. 4-352612

[51] Int. Cl.$^6$ .................................................. F16L 11/118
[52] U.S. Cl. ........................... 138/133; 138/138; 138/122
[58] Field of Search .................................. 138/133, 138, 138/146, 122, 125, 127, 129, 121

[56] References Cited

U.S. PATENT DOCUMENTS

| | | | |
|---|---|---|---|
| 3,047,026 | 7/1962 | Kahn | 138/121 |
| 3,916,953 | 11/1975 | Nagayoshi et al. | 138/129 |
| 4,186,778 | 2/1980 | Carey | 138/129 |
| 4,304,266 | 12/1981 | Kutnyak et al. | 138/129 |
| 4,350,547 | 9/1982 | Kanao | 138/122 |
| 4,693,324 | 9/1987 | Choiniere et al. | 138/129 |
| 4,957,792 | 9/1990 | Shizuo et al. | 138/122 |
| 5,129,428 | 7/1992 | Winter et al. | 138/121 |
| 5,416,270 | 5/1995 | Kanao | 138/122 |

FOREIGN PATENT DOCUMENTS 3-72856 7/1991 Japan .

*Primary Examiner*—Timothy F. Simone
*Assistant Examiner*—James F. Hook
*Attorney, Agent, or Firm*—Sughrue, Mion, Zinn, Macpeak & Seas

[57] ABSTRACT

A hose with reinforcing threads, includes an inner wall forming a pipe wall; a plurality of coated conductive wires spirally wound with a predetermined pitch; a plurality of reinforcing threads disposed on outer surfaces of the inner wall and the coated conductive wires along a pipe axis direction with a suitable interval in a circumferential direction; and an outer wall formed at an outside of the reinforcing threads. The outer portions over the coated conductive wires protrud outward so that the outer surface of the hose is spirally corrugated. The outer wall is formed of a plurality of synthetic resin band materials spirally wound for every pitch of the coated conductive wires.

6 Claims, 4 Drawing Sheets

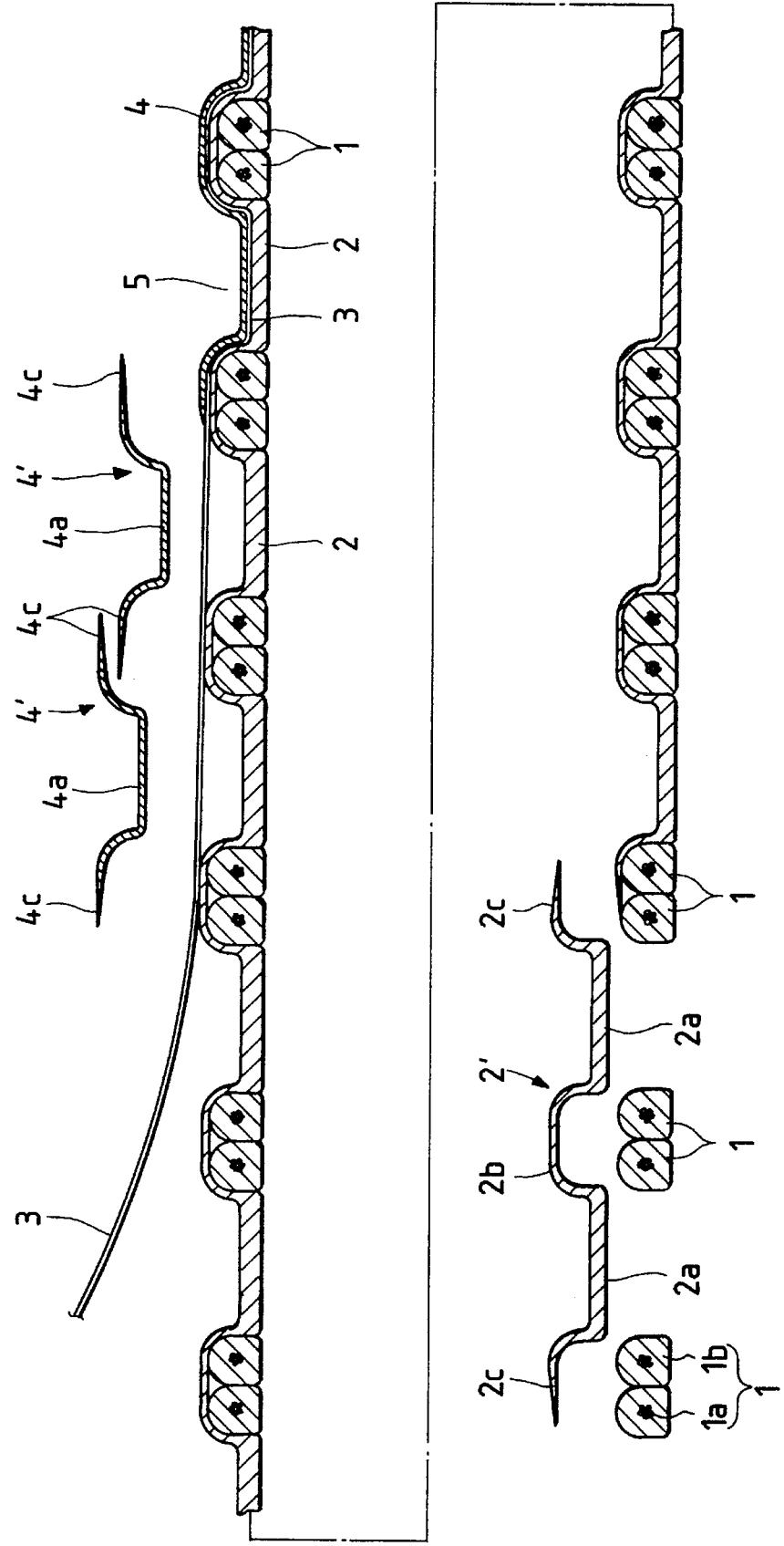

HOSE INCLUDING REINFORCING THREADS AND METHOD OF PRODUCING THE SAME

BACKGROUND OF THE INVENTION

The present invention relates to a flexible hose frequently used as a hose of a common electric vacuum cleaner. More particularly, the present invention relates to a flexible hose including reinforcing threads in which a coated conductive wire for electrical conduction is spirally wound and kept at the inner surface side of a synthetic resin pipe wall or in the pipe wall, and a plurality of reinforcing threads are disposed along a pipe axis direction between inner and outer layers of the pipe wall. The present invention also relates to a method of producing the same.

There is a conventional flexible hose, especially a cleaner hose, which is made of a synthetic resin and in which coated conductive wires for electrical conduction are disposed and kept in a pipe wall and reinforcing threads are provided around the outer surface of the pipe wall along the pipe axis direction as described in Japanese Utility Model Unexamined Publication No. Hei. 3-72856 filed by the present applicant.

As shown in FIGS. 7 and 8, in this conventional hose, two hard wire materials 13 and 13' as reinforcing wires are spirally wound in double pitches and buried in an inner wall 11 formed of double layers of two synthetic resin band materials 11a and 11b, and two coated conductive wires 12 and 12', each containing two conductive wires 12a and 12a' integrally coated with films 12c and 12c' which are connected through an intermediate portion 12b to form a cross section shaped like eye glasses, are spirally wound in double pitches around the respective hard wire materials 13 and 13'. As shown in FIG. 7, a plurality of reinforcing threads 16 are disposed on the outer surface thereof along the pipe axis direction with an appropriate interval in the circumferential direction. At the outer side thereof, a synthetic resin band material 14' having a width substantially equal to the double pitch width of the hard wire materials 13 and 13' are spirally wound, and the side edges of the band material 14' are overlapped with each other on the outer circumferential surface of one of the coated conductive wires to be integrally fused, and also fused to the inner wall 11, whereby an outer wall 14 is formed. The synthetic resin band material 14' forming the outer wall 14 has a width to be buried at the portions corresponding to two pitches of the two spirally wound coated conductive wires 12 and 12' at the same time.

In the conventional hose thus constructed, at the time of producing the hose, the synthetic resin band material 14' forming the outer wall 14 is spirally wound on the plurality of reinforcing threads 16 disposed along the pipe axis direction, and due to the winding pressure of the band material or by pressing the band material through pressing rolls or the like from the outer circumferential direction, the reinforcing threads 16 are pressed to the two bottom portions 15 at the same time so that the threads are disposed along the bottom portions 15 formed between the coated conductive wires 12 and 12' and pinched between the outer wall 14 and the inner wall 11. However, the respective reinforcing threads 16 pressed to the two bottom portions 15 are pulled in the right and left bottom portions so that is difficult to press the threads to be located till a corner portion of the bottom. Thus, the reinforcing threads 16 may rise at the corner portion of the bottom or partially rise due to inequable sinking in the right and left bottoms. As a result, the reinforcing threads 16 are pulled by a bending or pulling action during the usage of the hose, so that local cracks may be generated in the outer layer, or the inner and outer layers may be peeled away. That is, the conventional hose has a problem that the durability as the flexible hose is inferior.

SUMMARY OF THE INVENTION

In view of the above, an object of the present invention is to provide a hose with excellent durability and flexibility in which reinforcing threads disposed along a pipe axis direction is pressed easily and certainly to a corner portion of a bottom portion formed between adjoining ones of the spirally wound coated conductive wires in the state where the threads are positioned along an outer wall so that local cracks do not occur in the outer wall or peeling does not occur between the inner and outer layers even by repeated bending or pulling actions of the hose. Another object of the present invention is to provide a method of producing such a hose.

The hose of the present invention comprises an inner wall, a plurality of coated conductive wires spirally wound with a predetermined pitch, a plurality of reinforcing threads disposed on the outer surface thereof along the pipe axis direction with an appropriate interval in the circumferential direction, and an outer wall formed on the outside of the reinforcing threads. The portions over the coated conductive wires protrude in the outer circumferential direction and the outer surface of the pipe wall is spirally corrugated. The outer wall is formed of a plurality of synthetic resin band materials spirally wound for every one pitch of the coated conductive wires.

A method of producing such a hose of the present invention comprises an A step of spirally winding a plurality of coated conductive wires with a predetermined pitch and a B step of spirally winding synthetic resin band material with a width corresponding to a plurality of pitches of the coated conductive wires, and overlapping and connecting the side edge portions thereof to form the inner wall of a pipe. The A step may be carried out prior to the B step or after the B step. In case of carrying out the A step prior to the B step, in the B step, the band material is connected to the coated conductive wires. Then, a plurality of threads are disposed on the outer surface of both the coated conductive wires and the inner wall along the pipe axis direction with an appropriate interval in the pipe circumferential direction. Thereafter, on the outer surface of the reinforcing threads, a plurality of synthetic resin band material with a width corresponding to one pitch of the coated conductive wires are spirally wound for every one pitch of the coated conductive wires, and the side edge portions thereof are overlapped and connected to each other to form the outer wall of the pipe. As a result, there is produced a hose including threads in which the portions over the coated conductive wires protrude in the outer circumferential direction and the outer surface of the pipe wall is spirally corrugated.

The hose of the present invention may be formed so that the coated conductive wires are disposed at the inner circumferential side of the inner wall or at the outer circumferential side of the inner wall. In a case where the coated conductive wires are disposed at the inner circumferential side of the inner wall, the cross section of the band material forming the inner wall of the hose may be such that the band material has two or three flat portions buried at portions of two or three pitches of the coated conductive wires, and one or two recess portions in which the coated conductive wires are inserted, and the thickness of the flat portion is thicker than the thickness of the recess portion.

The coated conductive wire may be a single conductive wire coated with a film, two conductive wires arranged in parallel with a predetermined interval and integrally coated, or a wire arranged in parallel to a reinforcing wire such as a steel wire or a hard synthetic resin wire and integrally coated. The conductive wire may be a single copper wire, a converged wire/twisted wire of a plurality of fine copper wires or a knitted wire knitted in a net, a copper wire around a steel wire as an axis, or a wire (CP wire) formed of a steel wire coated with a good conducting metal such as copper. For reinforcing the hose, a reinforcing wire such as a steel wire or a hard synthetic resin wire may be used in addition to the coated conductive wire.

In the hose thus constructed, the outer wall is formed for every one pitch by a synthetic resin material with a width of one pitch of the coated conductive wire, so that the reinforcing thread is formed so as to certainly extend to the corner portion of the bottom portion of the pipe wall. Thus, in the hose of the present invention, there can be overcome the disadvantages that cracks occur in the outer wall or the outer wall rises to be peeled away from the inner wall by the straightening action of the reinforcing thread during the usage of the hose. Also, when the hose is produced, the synthetic resin band materials forming the outer wall are spirally wound along the coated conductive wires for every pitch of the coated conductive wires, so that the reinforcing threads can be certainly pressed along the shape of the bottoms successively formed for every pitch of the coated conductive wires concurrently with the spiral winding of the synthetic resin band material. Thus, rising of the reinforcing threads can be certainly prevented.

Further, the synthetic resin band material forming the inner wall has flat portions between adjacent coated conductive wires, and the thickness of the flat portion is thicker than the thickness of the recess portion, so that the hose wall portions buried at portions between adjacent coated conductive wires hardly contracts. Thus, the inner surface of the hose can always be kept flat and a suction resistance of air can be made small.

BRIEF DESCRIPTION OF THE DRAWINGS

FIG. 3 is a sectional view showing a pipe wall portion in production steps of the hose.

DETAILED DESCRIPTION OF THE PREFERRED EMBODIMENTS

Figure 1:
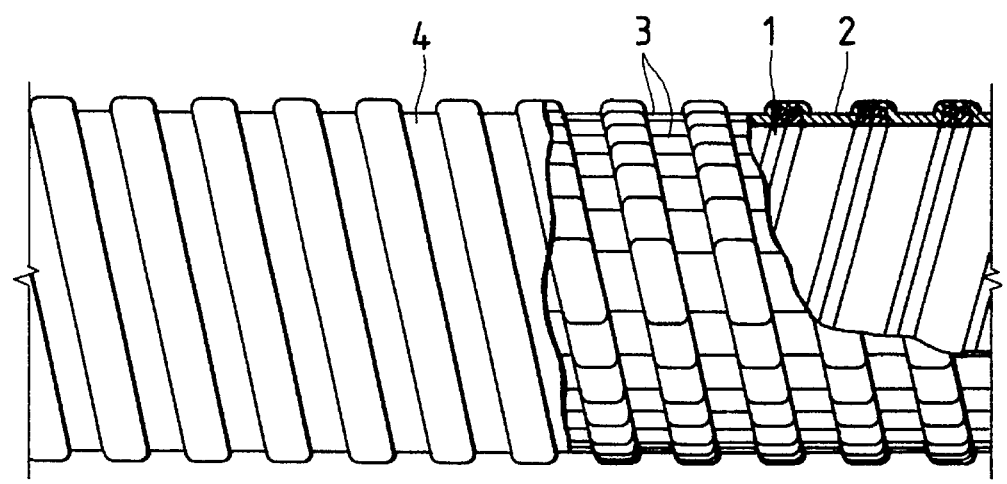
FIG. 1 is a partially broaken side view showing a hose according to an embodiment of the present invention.

The preferred embodiments of the present invention will be described with reference to the accompanying drawings.

Components shown in FIG. 3 will be first described for convenience of description.

In FIG. 3, coated conductive wires 1 are spirally wound with a predetermined pitch, in which a conductive wire 1$a$ is coated with a synthetic resin film 1$b$. Two coated conductive wires 1 are arranged in parallel to each other, and the adjoining side portions thereof are fused and bonded to each other to a degree that they are easily separated. The lower surface thereof is made flat. Synthetic resin band material 2' is spirally wound on the outer surfaces of the spirally wound coated conductive wires 1 to form an inner wall 2. The band material 2' has a lateral width corresponding to about two pitches of a pair of coated conductive wires 1, and has a flat portion 2$a$ buried at a portion between the adjacent coated conductive wires 1 and a recess portion 2$b$ into which the coated conductive wire 1 is inserted. The thickness of the flat portion 2$a$ is thicker than the thickness of the portion forming the recess portion 2$b$.

Reinforcing threads 3 for reinforcing a pipe wall are disposed on the outer surface of the inner wall formed of the band materials 2' along the pipe axis direction with an appropriate interval in the circumferential direction. Synthetic resin band materials 4' are spirally wound from the outside of the reinforcing threads 3 to form an outer wall 4. The band material 4' has a lateral width corresponding to about one pitch of the coated conductive wire 1, and is made thin. In general, although the band material 4' is formed in a flat band, the band material shown in FIG. 3 has a center flat portion 4$a$ buried at the bottom portion between the coated conductive wires 1.

Further, the components will be described in more detail. The band material 2' forming the inner wall is soft polyvinyl chloride (PVC) resin, and the width except for overlapping portions is about 20 mm, the thickness of the flat portion 2$a$ is about 0.6–0.7 mm, and the thickness of the recess portion is about 0.3–0.4 mm. The coated conductive wire 1 is formed of a collected wire 1$a$ of copper fine wires coated with hard material of polyvinyl chloride like the band material 2'. The laterial width thereof is 2.0 mm. The reinforcing thread 3 is a nylon twisted thread. The band material 4' forming the outer wall 4 is soft vinyl chloride resin, the total width except for overlapping portions is about 10 mm, and the thickness is about 0.2–0.3 mm.

A method of producing a hose using such components will be described with reference to FIG. 3.

Four coated conductive wires 1 are concurrently extruded from a synthetic resin extruder (not shown) disposed at a side of a cylindrical mold body (not shown) forming a pipe. The wires are combined to form two pairs of coated conductive wires 1, and these wires are spirally wound on the mold body in double pitch with a pitch interval of about 10 mm. Similarly, from a synthetic resin extruder disposed at a side of the mold body, the band material 2' of synthetic resin having the above described cross section and a width corresponding to the pitch width of the two pairs of coated conductive wires 1 are extruded, and are spirally wound on the spirally wound coated conductive wires 1. The flat portion 2$a$ covers the portion between adjacent coated conductive wires 1 and the recess portion 2$b$ at the center covers one pair of conductive wires 1. The side edge portions 2$c$ cover the other pair of conductive wires 1 and are overlapped on the upper portion thereof to be fuses to form the inner wall 2 of the pipe. At this time, the band material 2' and the coated conductive wires 1 are fused and bonded to each other.

Next, a plurality of reinforcing threads 3 are disposed on the outer surface of both the coated conductive wires 1 and the inner wall 2 along the pipe axis direction with an appropriate interval in the circumferential direction as shown in FIG. 1. Then, on the outer surface of the reinforcing threads 3, from one or two extruders disposed at the side of the mold body, two synthetic resin band materials 4' each having a width corresponding to one pitch of the coated conductive wires 1 are extruded, and these band materials 4' are spirally wound for every one pitch of the coated conductive wires. The respective flat portions 4a of the respective band materials are positioned so that the reinforcing threads 3 are successively pressed to portions between the adjacent coated conductive wires 1. The side edge portions 4c are overlapped on the outer surface of the conductive wire 1 to be bonded to each other, and at the same, the band material is bonded to the inner wall 2 to form the outer wall 4 of the pipe.

As described above, there is produced a spiral hose in which portions over the coated conductive wires 1 protrude outward with an interval of about 10 mm so that the outer surface of the pipe wall is spirally corrugated, the inner circumferential surface of the pipe wall is substantially linear and cylindrical, and the reinforcing threads are pinched and buried between the inner wall 2 and the outer wall 4 of the pipe wall.

Figure 2:
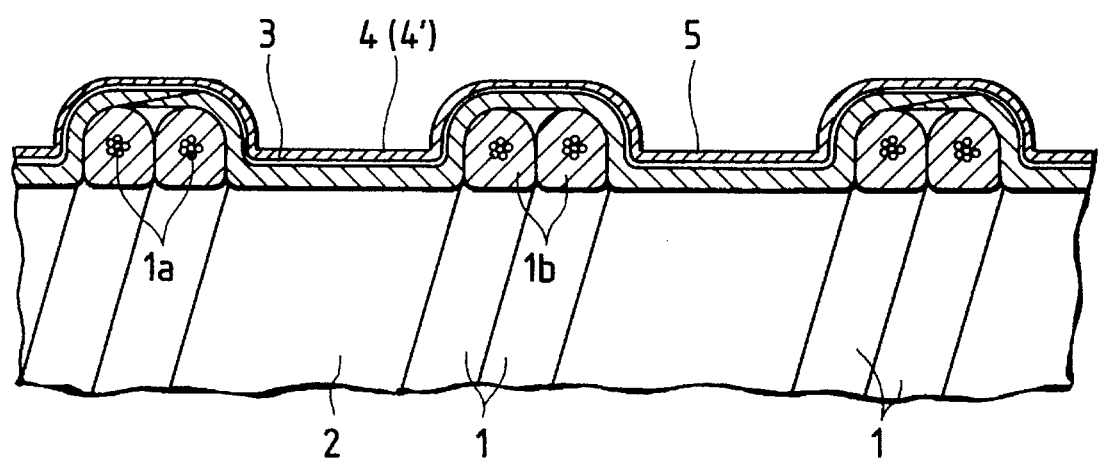
FIG. 2 is an enlarged sectional view showing a part of a wall of the hose of FIG. 1.

That is, as shown in FIGS. 1 and 2, the hose thus constructed comprises the inner wall 2 forming the pipe wall, two pairs of coated conductive wires 1 spirally wound in double pitch with a pitch interval of about 10 mm, a plurality of reinforcing threads 3 disposed on the outer surfaces thereof along the axial direction with an appropriate interval in the circumferential direction, and the outer wall 4 formed at the outside of the reinforcing threads 3. The portions over the coated conductive wires 1 protrude outward so that the outer surface of the pipe wall is spirally corrugated. Further, the outer wall 4 is formed of two synthetic resin band materials 4' spirally wound for every one pitch of the two pairs of coated conductive wires 1. The thickness of the pipe wall at the portion between adjacent coated conductive wires 1, that is, the thickness of the pipe wall at the bottom portion 5 is thicker than the thickness of the pipe wall covering the coated conductive wires 1.

In the hose thus constructed, though the coated conductive wires 1 are formed in double pitch, since the synthetic resin band material 4' forming the outer wall 4 is formed to have a width of one pitch of the coated conductive wire 1, when the synthetic resin band material 4' is spirally wound from the outside of the reinforcing threads 3, the reinforcing threads 3 can be sequentially pressed to the bottom portions 5 formed between the adjacent coated conductive wires 1 without fail. Thus, rising of the reinforcing threads 3 can be prevented from happening without fail. Also, in the hose of this embodiment, since the thickness of the flat portion 2a is thicker than that of the recess portion 2b, the flat portion 2a buried at the portion between adjacent coated conductive wires 1 hardly contracts. Thus, the inner surface of the hose can be held almost flat and the suction resistance of air can always be made small so that wind loss can be prevented.

The coated conductive wires 1 are not extruded in a body and concurrently from one orifice of an extruder but are separately extruded from separate independent orifices, and immediately after the extrusion, they are arranged in parallel and contacted to each other to be fused and bonded to a degree that the adjoining side portions can be easily separated. Thus, in wire connecting operation of the inner conductive wires 1a, they can be separated into individual coated conductive wires 1 by a slight pulling separating force without using a tool.

Figure 4:
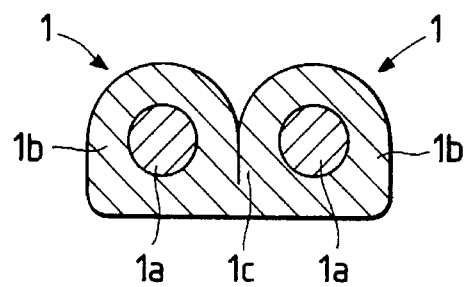
FIG. 4 is a sectional view showing a coated conductive wire of another embodiment.

The coated conductive wires 1 may be formed, for example, as shown in FIG. 4, such that two coated conductive wires 1 are arranged at the right and left sides of a center separate line 1c so that they are easily separated, that is, they are integrally formed in a state where a portion is connected. The conductive wire 1a shown in FIG. 4 is one copper wire coated with a resin. When two coated conductive wires 1 are integrally connected as shown in FIG. 4, they are not separated at the spiral winding to form the hose. Thus, they are advantageous in that winding is performed easily.

Figure 5:
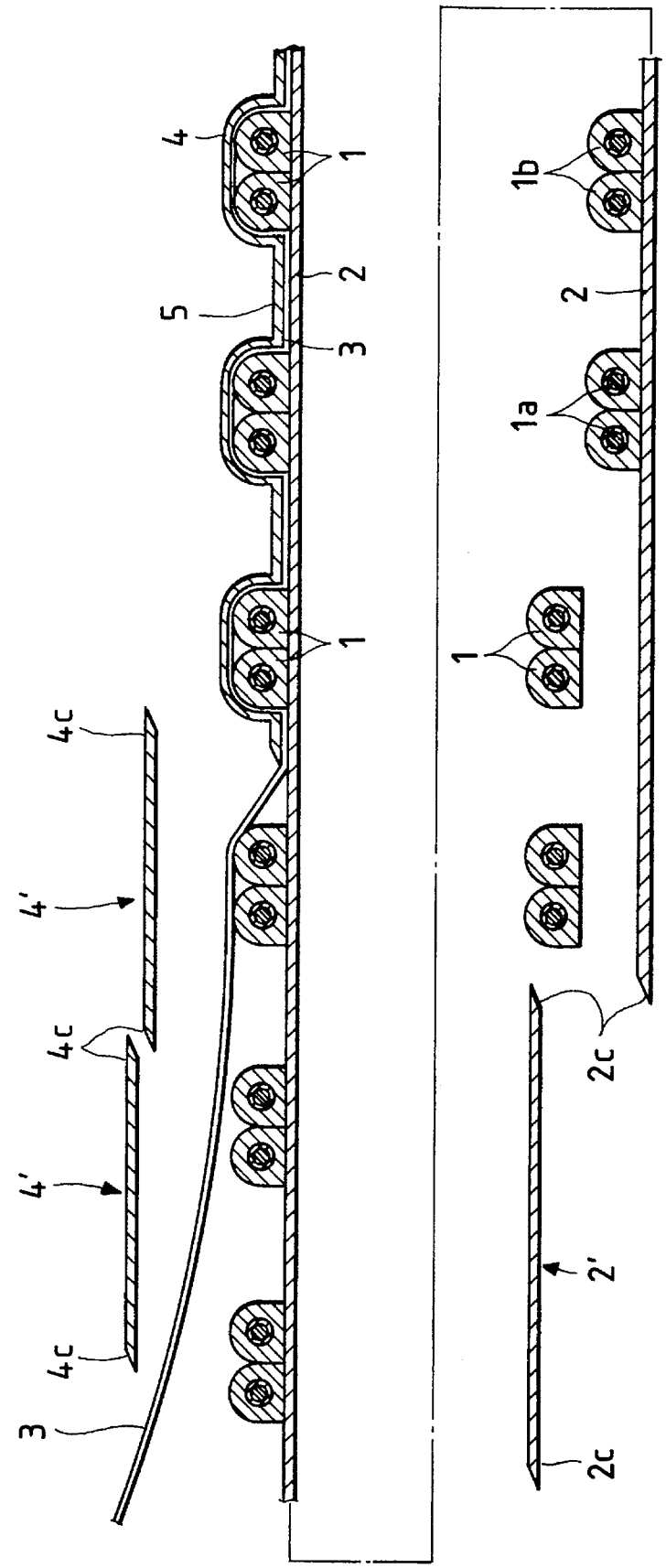
FIG. 5 is a sectional view showing a pipe wall portion in production steps of the hose of another embodiment.

FIG. 5 shows a hose of another embodiment in which coated conductive wires 1 are wrapped between the inner and outer walls 2 and 4, and a method of producing the same. First, the method of producing the hose will be described. On a cylindrical mold body (not shown) forming a pipe, a flat synthetic resin band material 2' having a width corresponding to a pitch width of two pairs of the coated conductive wires 1 is extruded from an extruder. The extruded band material is spirally wound and side edge portions 2c thereof are overlapped and fused to each other to form the inner wall 2. On the outer surface of the inner wall, two pairs of coated conductive wires 1 are spirally wound in double pitch with a pitch interval of about 10 mm. At this time, the coated conductive wires may be connected to the previously wound band material 2', that is, to the inner wall 2 or may not be connected.

Next, on both the coated conductive wires 1 and the inner wall 2, a plurality of reinforcing threads 3 are disposed along the pipe axis direction with an appropriate interval in the circumferential direction as in the previous embodiment. Then, on the outer surface of the reinforcing threads 3, as in the previous embodiment, two flat synthetic resin band materials 4' each having a width corresponding to one pitch of the coated conductive wires 1 are extruded from one or two extruders. These band materials 4' are spirally wound for every pitch of the coated conductive wires, so that the center portion of each band material in the width direction wraps a pair of coated conductive wires 1, and at the same time, the band materials press the reinforcing threads 3 to the portions between adjacent coated conductive wires 1. The side edge portions 4c are overlapped and fused to each other at the portions between adjacent conductive wires 1, and at the same time, the band material is fused and connected to the inner wall 2 to form the outer wall 4. At this time, the band material may be connected to the coated conductive wires 1 or may not be connected thereto.

As described above, like the hose of the previous embodiment, there is produced a hose in which the portions over the respective conductive wires 1 protrude outward with an interval of 10 mm, the outer surface of the pipe wall is spirally corrugated, the inner surface of the pipe wall is substantially linear, and the reinforcing threads are pinched and buried between the inner wall 2 and the outer wall 4.

Figure 6:
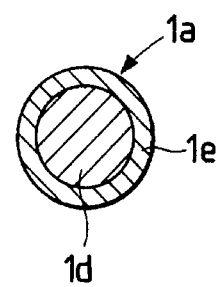
FIG. 6 is a sectional view showing a conductive wire.

As shown in FIG. 6, the conductive wire 1a of the coated conductive wire 1 in this embodiment is a wire (CP wire) in which a hard iron wire 1d is coated with a copper film 1e. When such a wire is used, since the hard iron wire 1d serves to reinforce and maintain the shape of the hose, such a wire is suitable for a hose which it is required to have a strong shape maintaining property.

Figure 7:
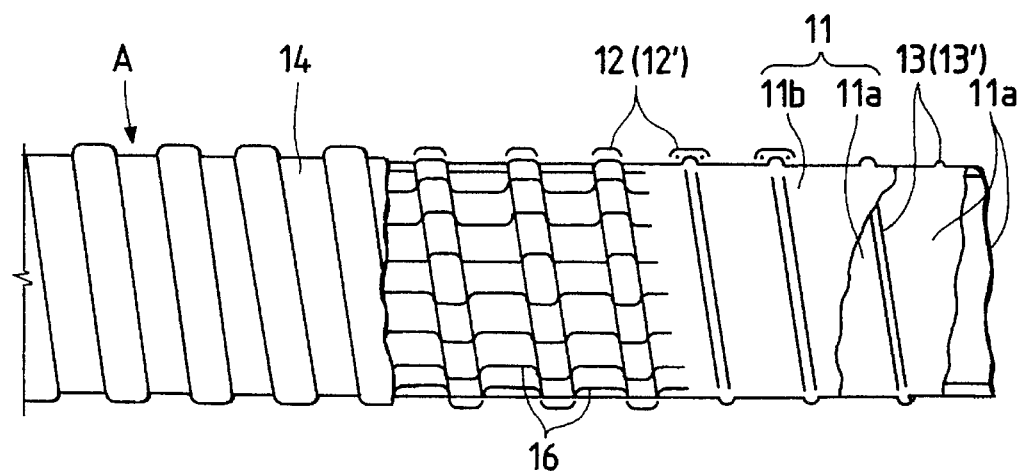
FIG. 7 is a partially broaken side view showing a conventional hose.
Figure 8:
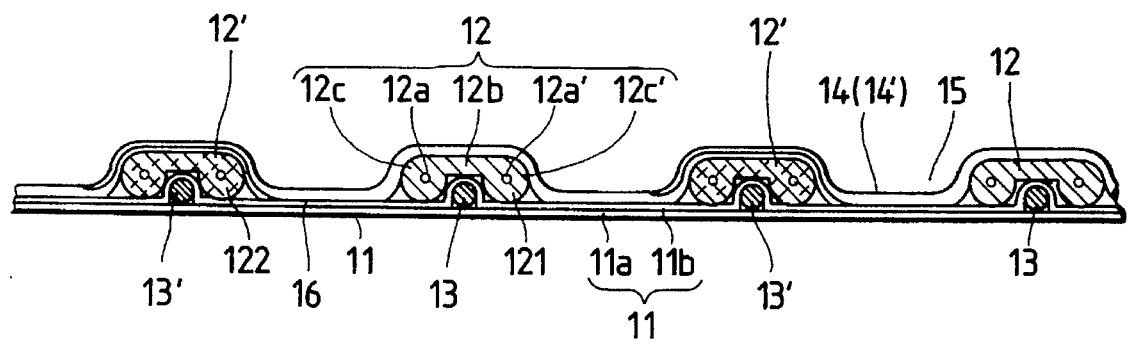
FIG. 8 is an enlarged sectional view showing a pipe wall portion of the conventional hose.

In the above description, although the preferred embodiments have been presented, the present invention is not limited to the methods and structures of these embodiments. For example, as in the hose shown in FIGS. 7 and 8, a metal wire may be used in addition to the coated conductive wire, and an inner wall may be made of two layers at the inner side of the reinforcing threads. The present invention may be modified and practiced within the scope in which the structure described above is provided, the objects of the present invention are achieved, and the following effects are obtained.

As described above, in a method of producing the hose of the present invention, although a hose with a plurality of coated conductive wires are produced, since the synthetic resin band material forming the outer wall has a width of about one pitch of the coated conductive wire, when the band material is spirally wound from the outside of the reinforcing threads to form the outer wall, it is possible to press a plurality of reinforcing threads sequentially without fail for every bottom portion formed between the adjacent coated conductive wires. Accordingly, the present invention is advantageous in that a hose without rising of the reinforcing threads can be easily and certainly obtained.

Also, in the hose of the present invention, the reinforcing threads are wrapped and buried at the respective bottom portions between the coated conductive wires in a state where rising of the threads does not occur and the threads sink to the bottoms of the pipe wall. Thus, the flexibility of the hose is not damaged by pulling of the reinforcing threads so that good flexibility can be held, and even for repeated bending for a long period, it can be eliminated a fear that the outer wall is apt to be cracked locally due to the tensile action of the reinforcing threads. Accordingly, the present invention has superior effects in that the hose can be used for a long time while maintaining good properties.

What is claimed is:

1. A hose including reinforcing threads, comprising:
   a plurality of coated conductive wires spirally wound with a predetermined pitch, wherein one pitch is defined as a distance between adjoining coated conductive wires;
   an inner wall forming a pipe wall, said inner wall being formed of a spirally wound band material, said band material being wound with a width equal to plural pitches of said coated conductive wires thereby to increase a winding efficiency and facilitate a winding operation, said inner wall being bonded to said coated conductive wires;
   a plurality of reinforcing threads disposed in a corrugated state on outer surfaces of said inner wall and said coated conductive wires along a pipe axis direction with a suitable interval in a circumferential direction; and
   an outer wall formed at an outside of said reinforcing threads and which is bonded to said inner wall, said outer wall including a portion over said coated conductive wires protruding outward so that said outer wall is spirally corrugated, wherein said outer wall is formed of a plurality of synthetic resin band materials spirally wound for every pitch of said coated conductive wires.

2. The hose including reinforcing threads as claimed in claim 1, wherein said plurality of coated conductive wires comprises two coated conductive wires arranged in parallel to each other and wherein adjoining side portions thereof are joined together by a reduced thickness portion which is easily separated.

3. The hose including reinforcing threads as claimed in claim 2, wherein said two coated conductive wires are bonded to each other so as to have a cross section with two semicircular protrusions and a flat bottom portion, the flat bottom portion and the inner wall forming a substantially cylindrical, smooth inner hose surface.

4. A hose including reinforcing threads, comprising:
   a plurality of coated conductive wires spirally wound with a predetermined pitch, wherein one pitch is defined as a distance between adjoining coated conductive wires;
   an inner wall having a substantially cylindrical inner surface and a corrugated outer surface, said inner wall being formed of a synthetic resin band material which has a width substantially equal to two pitches of said coated conductive wires, is spirally wound on outer surfaces of said coated conductive wires thereby to increase a winding efficiency and facilitate a winding operation, and is bonded to said coated conductive wires;
   a plurality of reinforcing threads disposed in a corrugated state on an outer surface of said inner wall along a pipe axis direction with a suitable interval in a circumferential direction; and
   an outer wall having a spirally corrugated outer surface and which is bonded to said inner wall, said outer wall being formed of a plurality of thin synthetic resin band materials each having a width substantially equal to one pitch of said coated conductive wires and being spirally wound on outsides of said reinforcing threads for every pitch of said coated conductive wires.

5. The hose including reinforcing threads as claimed in claim 4, wherein said band material forming said inner wall has flat portions buried at portions between adjacent ones of said coated conductive wires and portions covering said coated conductive wires, a thickness of said flat portions being thicker than a thickness of said portions covering said conductive wires.

6. The hose including reinforcing threads as claimed in claim 4, wherein said plurality of coated conductive wires comprises two coated conductive wires arranged in parallel to each other and wherein adjoining side portions thereof are joined together by a reduced thickness portion which is easily separated.

* * * * *